(12) United States Patent
Clark et al.

(10) Patent No.: US 9,756,841 B2
(45) Date of Patent: Sep. 12, 2017

(54) FISHING HOOK SETTER

(71) Applicant: Dennis Clark, South Jordan, UT (US)

(72) Inventors: John Arthur Clark, South Jordan, UT (US); Dennis Clark, South Jordan, UT (US)

(73) Assignee: Dennis Clark, South Jordan, UT (US)

( * ) Notice: Subject to any disclaimer, the term of this patent is extended or adjusted under 35 U.S.C. 154(b) by 173 days.

(21) Appl. No.: 14/958,290

(22) Filed: Dec. 3, 2015

(65) Prior Publication Data
US 2016/0165869 A1 Jun. 16, 2016

Related U.S. Application Data

(60) Provisional application No. 62/185,451, filed on Jun. 26, 2015, provisional application No. 62/091,240, filed on Dec. 12, 2014.

(51) Int. Cl.
*A01K 91/10* (2006.01)

(52) U.S. Cl.
CPC .................................... *A01K 91/10* (2013.01)

(58) Field of Classification Search
CPC combination set(s) only.
See application file for complete search history.

(56) References Cited

U.S. PATENT DOCUMENTS

| | | | |
|---|---|---|---|
| 2,918,746 A | 11/1958 | Hamrick | |
| 2,931,121 A * | 4/1960 | Torbett | A01K 91/10 242/252 |
| 2,964,868 A * | 12/1960 | Bennett | A01K 97/11 43/15 |
| 3,078,609 A * | 2/1963 | Efird | A01K 91/10 43/15 |
| 3,897,646 A * | 8/1975 | Sheets | A01K 97/11 43/15 |
| 4,197,668 A | 4/1980 | McKinsey | |
| 4,235,035 A * | 11/1980 | Guthrie | A01K 97/11 43/15 |
| 4,471,553 A * | 9/1984 | Copeland | A01K 97/11 43/15 |
| 4,676,018 A * | 6/1987 | Kimball | A01K 97/11 43/15 |

(Continued)

OTHER PUBLICATIONS

All Jacker; Eliminates problems by setting rod and hook in ice; 1 pages; https://www.jawjackerfishing.com/.

*Primary Examiner* — Christopher P Ellis
(74) *Attorney, Agent, or Firm* — Thorpe, North & Western, LLP

(57) ABSTRACT

A fishing hook setter to carry a fishing pole has a pole holder pivotally coupled to a base. A biasing member biases the pole holder between a raised set position, and a lowered fishing position. A trip mechanism is coupled between the base and the pole holder to hold the pole holder in the lowered fishing position and is engaged by a fishing line to release the pole holder. The trip mechanism has a trigger post affixed to the pole holder and a trigger pivotally coupled to the base and releasably engaging a distal free end of the trigger post. The trigger has a stop positioned in front of the distal free end of the trigger post and an armature oriented in a raised orientation in the cocked position of the trigger. The trigger can have a wheel coupled the distal free end of the trigger post.

20 Claims, 9 Drawing Sheets

(56) References Cited

U.S. PATENT DOCUMENTS

| | | | |
|---|---|---|---|
| 4,730,408 A * | 3/1988 | Miller | A01K 97/11 43/15 |
| 5,245,778 A | 9/1993 | Gallegos et al. | |
| 5,542,205 A | 8/1996 | Updike | |
| 5,873,191 A | 2/1999 | Bova et al. | |
| 5,903,998 A | 5/1999 | Hawkins et al. | |
| 6,050,019 A | 4/2000 | Anderson | |
| 6,094,851 A | 8/2000 | Guidry | |
| 6,681,516 B2 * | 1/2004 | Fayerman | A01K 97/11 43/15 |
| 6,772,551 B1 | 8/2004 | Bielinski, Sr. et al. | |
| 7,086,194 B1 * | 8/2006 | Troyer, Jr. | A01K 97/11 43/15 |
| 7,316,094 B1 * | 1/2008 | Bishop | A01K 97/01 43/15 |
| 7,743,548 B1 * | 6/2010 | Cashaw | A01K 97/11 43/15 |
| 7,975,426 B2 * | 7/2011 | Cabrera | A01K 97/11 43/15 |
| 8,567,108 B1 | 10/2013 | Babbs et al. | |
| 2008/0134563 A1 | 6/2008 | Gunter | |

* cited by examiner

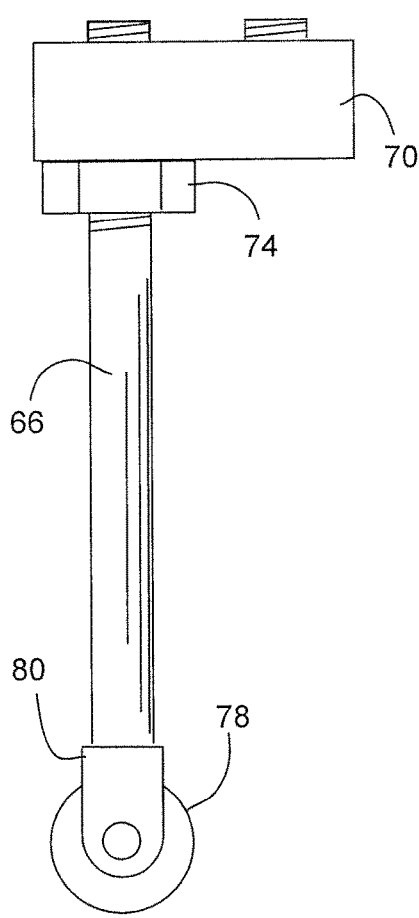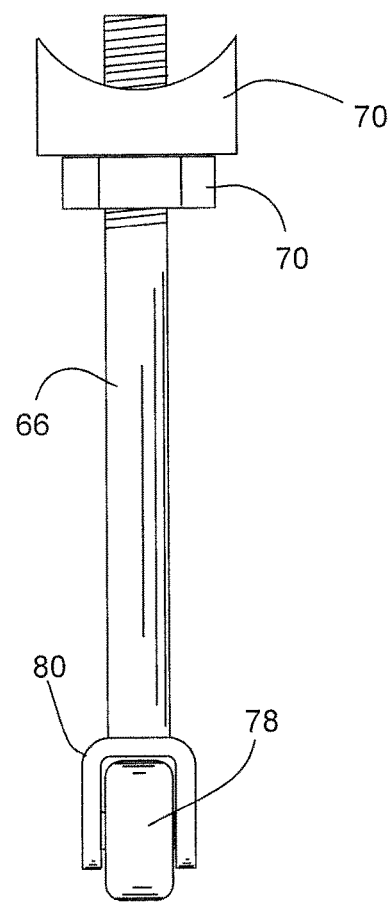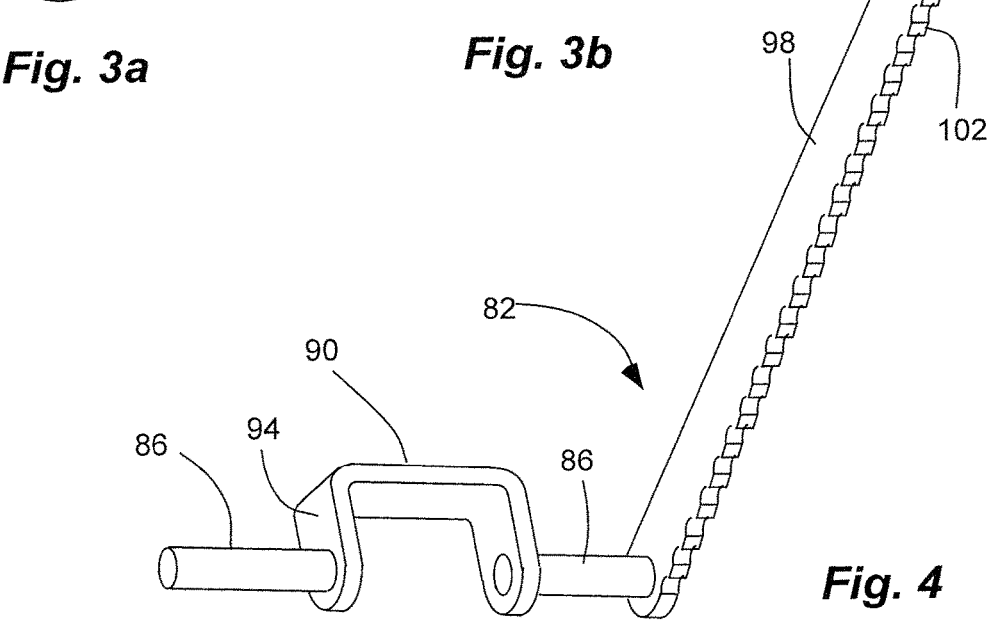
*Fig. 3a*
*Fig. 3b*
*Fig. 4*

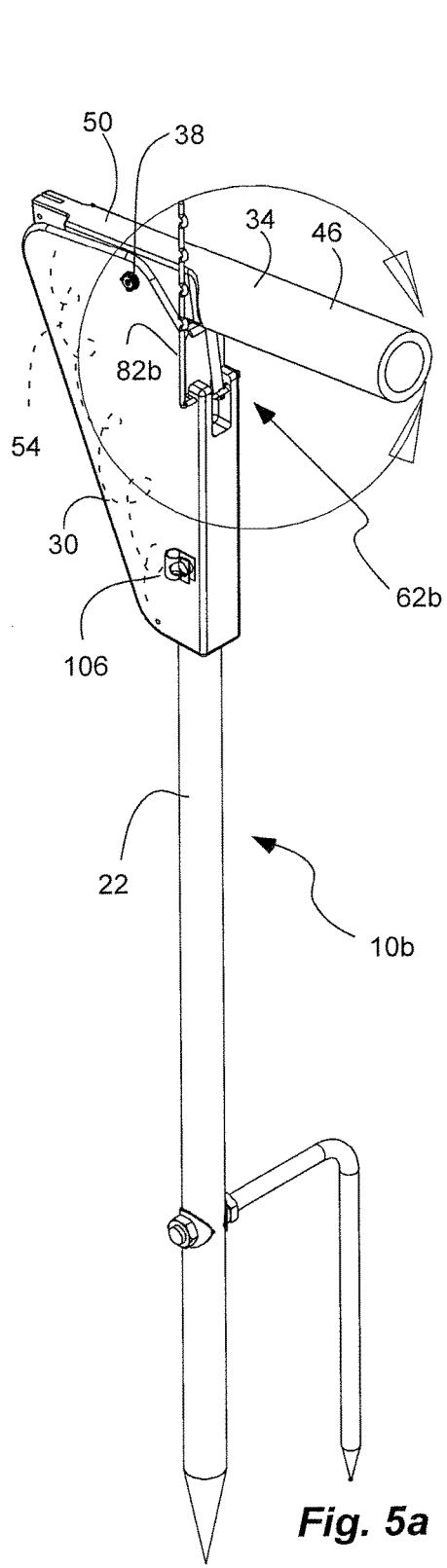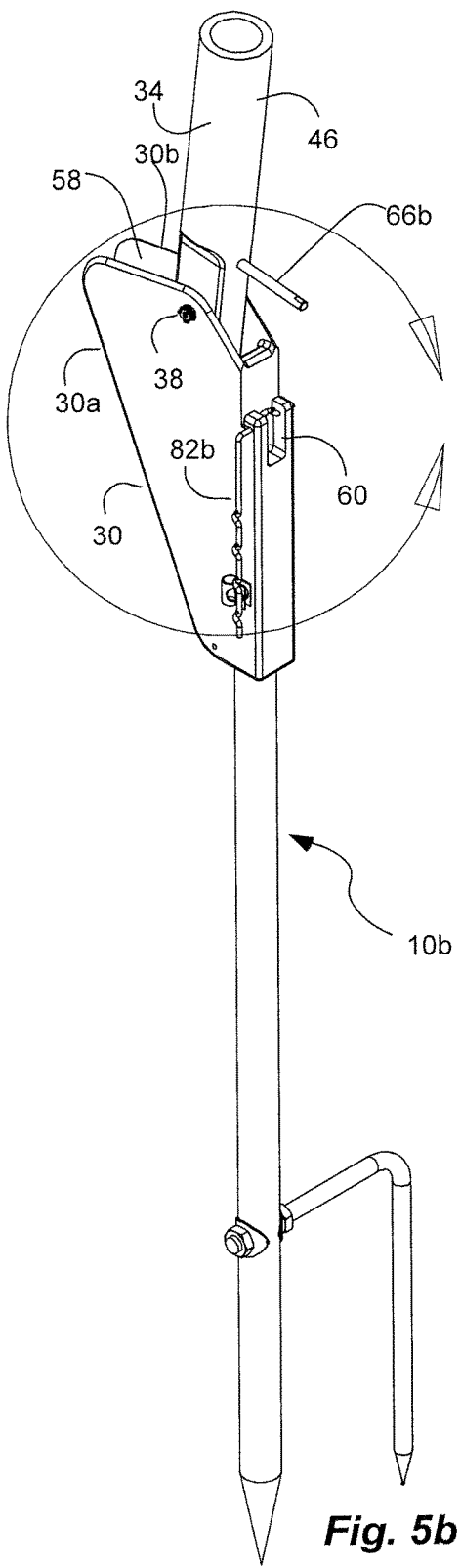
*Fig. 5a*  *Fig. 5b*

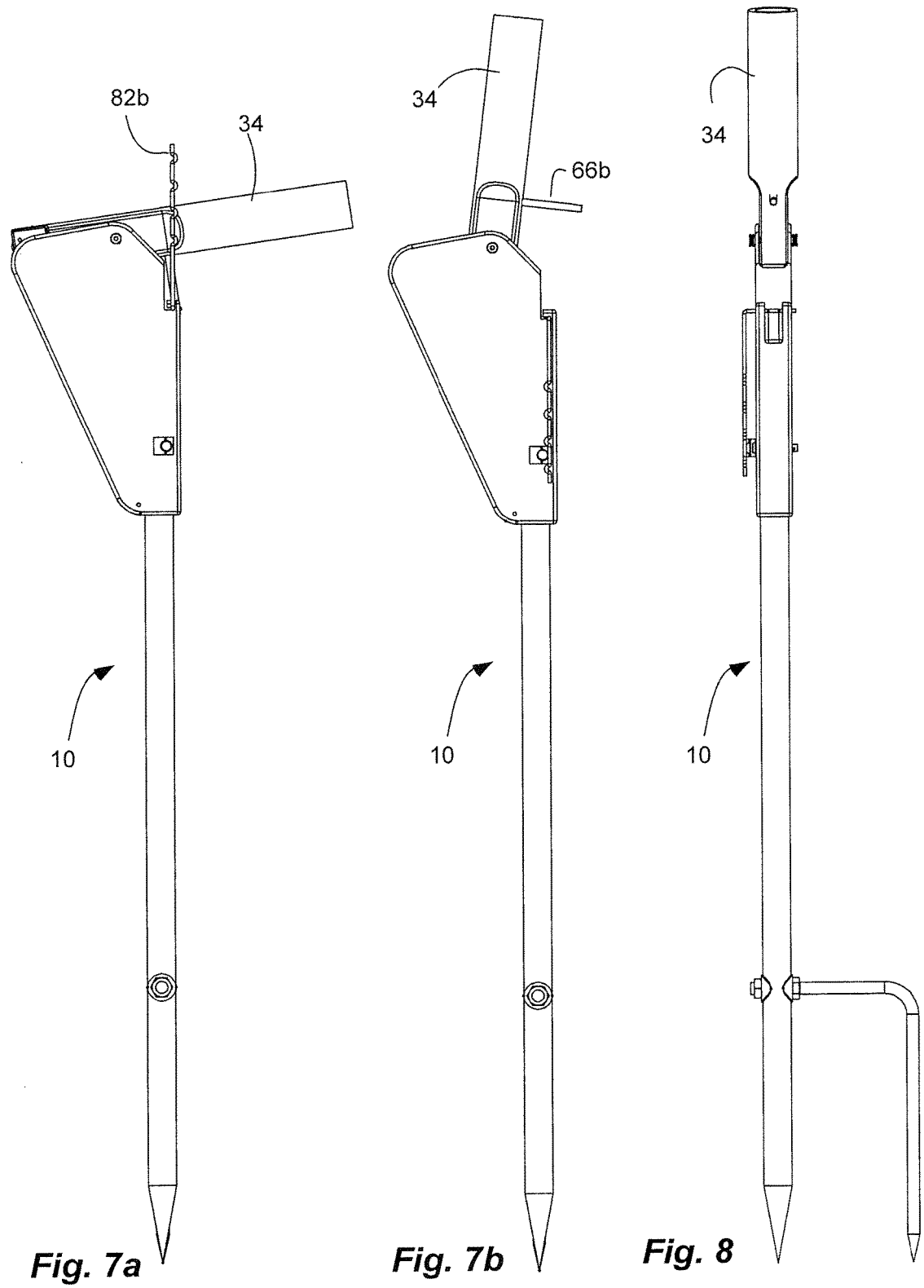
*Fig. 7a*  *Fig. 7b*  *Fig. 8*

_US 9,756,841 B2_

FISHING HOOK SETTER

PRIORITY CLAIM(S)

Priority is claimed to copending U.S. Provisional Patent Application Ser. Nos. 62/185,451, filed Jun. 26, 2015; and 62/091,240, filed Dec. 12, 2014; which are hereby incorporated herein by reference.

BACKGROUND

Field of the Invention

The present invention relates generally to fishing. More particularly, the present invention relates to an automatic fishing hook setter.

Related Art

Various different types of hook setters have been proposed, but are often complicated, and can be difficult to use.

SUMMARY OF THE INVENTION

It has been recognized that it would be advantageous to develop a fishing hook setter that is effective and easy to use.

The invention provides a fishing hook setter device to receive and carry a fishing pole with a fishing line. The fishing hook setter comprises a base to be secured to a support surface. A pole holder is pivotally coupled to the base at a pivot. The pole holder has an open end to removably receive and carry the fishing pole. The open end of the pole holder defines a front. The pole holder is pivotal between a lowered fishing position, and a raised set position. A biasing member is coupled between the base and the pole holder rearward of the pivot. The biasing member biases the pole holder to the raised set position, and maintains tension on the pole holder in the lowered fishing position. A trip mechanism is coupled between the base and the pole holder to hold the pole holder in the lowered fishing position against the biasing member. The trip mechanism is engaged by the fishing line such that tension on the fishing line trips the trip mechanism to release the pole holder to move to the raised set position. The trip mechanism comprises a trigger post rigidly affixed to and extending from the pole holder, and located forward of the pivot. The trigger post pivots with the pole holder between a lowered position, corresponding to the lowered fishing position of the pole holder, and a raised position, corresponding to the raised set position of the pole holder. The trigger post has a distal free end. The trip mechanism also comprises a trigger pivotally coupled to the base. The trigger releasably engages the distal free end of the trigger post in the lowered position, to define a cocked position. The trigger is engaged by the fishing line to pivot the trigger. The trigger has an axel pivotally coupled to the base, a stop axially off-set with respect to the axel to which the distal free end of the trigger post abuts in the lowered position, an armature extending from the axel, and a notch in the armature to receive the fishing line. The armature and the stop pivot together about the axel.

In accordance with a more detailed aspect of the invention, the stop of the trigger can be positioned in front of the distal free end of the trigger post in the cocked position of the trigger. The armature can be oriented in a raised orientation extending upwardly from the axel in the cocked position of the trigger.

In accordance with another more detailed aspect of the invention, the hook setter can further comprise a wheel coupled to the distal free end of the trigger post and rotatable with respect to the trigger post and the stop of the trigger.

In accordance with another more detailed aspect of the invention, the trigger post can be extendable and retractable with respect to the pole holder so that the distal free end of the trigger post is selectively positionable with respect to the stop of the trigger.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein:

FIG. 3a is a side view of the trigger post of the trip mechanism of the hook setter of FIG. 1a;

FIG. 3b is a front view of the trigger post of the trip mechanism of the hook setter of FIG. 1a;

FIG. 4 is a perspective view of the trigger of the trip mechanism of the hook setter of FIG. 1a;

FIG. 5a is a perspective view of another automatic fishing hook setter in accordance with another embodiment of the invention, shown with a fishing pole removed, and shown with a pole holder in a lowered fishing position, and shown with a trigger post of a trip mechanism in a lowered position and a trigger of the trip mechanism in a cocked position;

FIG. 5b is a perspective view of the hook setter of FIG. 5a, shown with a fishing pole removed, and shown with the pole holder in a raised set position, and shown with the trigger post of the trip mechanism in a raised position and the trigger of the trip mechanism in an un-cocked position;

FIG. 7a is a side view of the hook setter of FIG. 5a, shown with the pole holder in the lowered fishing position, and shown with the trigger post of the trip mechanism in the lowered position and the trigger of the trip mechanism in the cocked position;

FIG. 7b is a side view of the hook setter of FIG. 5a, shown with the pole holder in the raised set position, and shown with the trigger post of the trip mechanism in the raised position and the trigger of the trip mechanism in the uncocked position;

FIG. 8 is a front view of the hook setter of FIG. 5a, shown with the pole holder in the raised set position, and shown with the trigger post of the trip mechanism in the raised position and the trigger of the trip mechanism in the uncocked position; and FIG. 9 is a perspective view of the trigger of the trip mechanism of the hook setter of FIG. 5a.

Figures 1A, 1B:
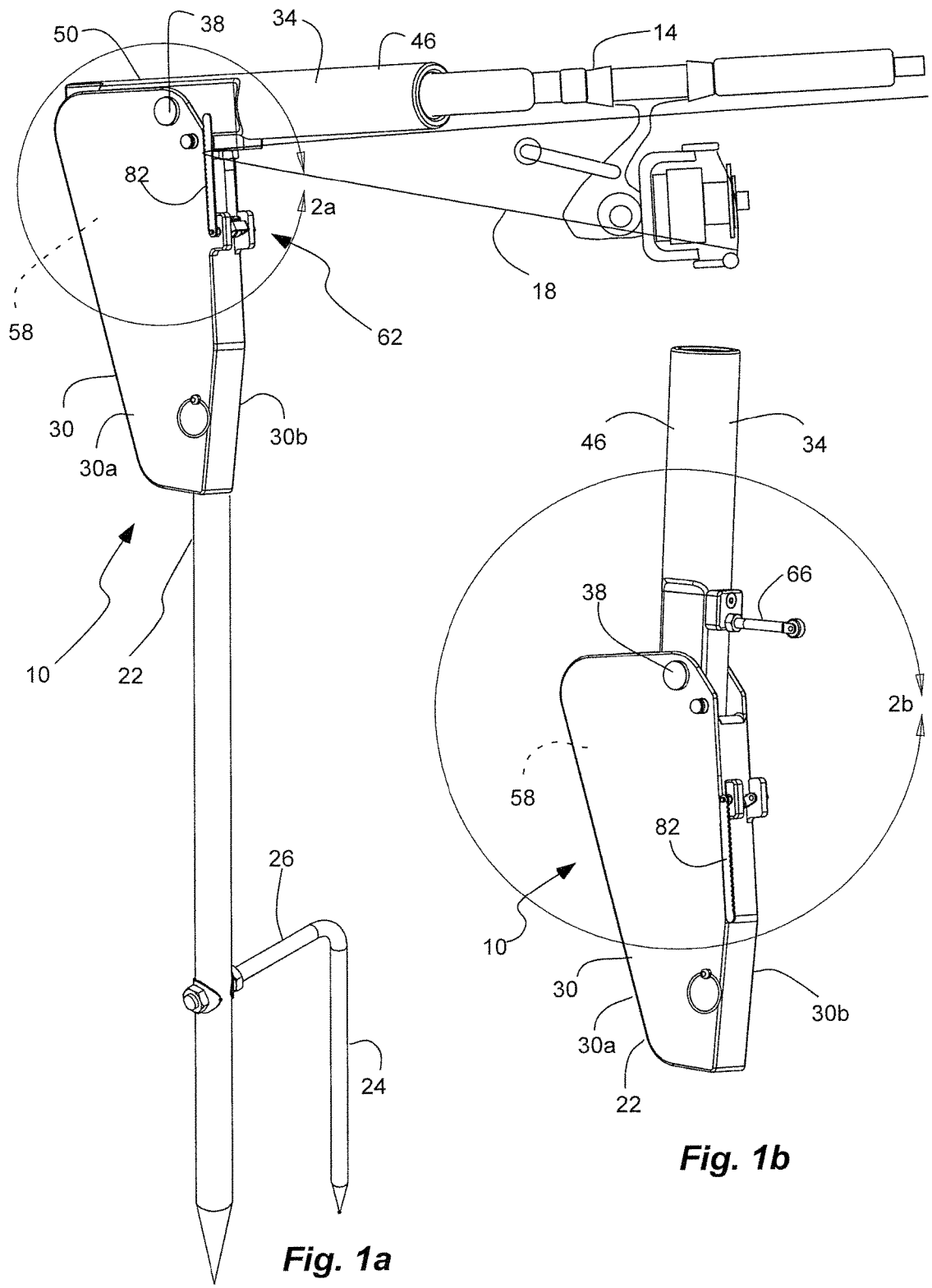
FIG. 1a is a perspective view of an automatic fishing hook setter in accordance with an embodiment of the invention, shown with a typical fishing pole carried by the hook setter, and shown with a pole holder in a lowered fishing position, and shown with a trigger post of a trip mechanism in a lowered position and a trigger of the trip mechanism in a cocked position.
FIG. 1b is a detailed perspective view of the hook setter of FIG. 1a, shown with the pole holder in a raised set position, and shown with the trigger post of the trip mechanism in a raised position and the trigger of the trip mechanism in an un-cocked position.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

As illustrated in FIGS. 1a-4, an automatic fishing hook setter, indicated generally at 10, in an example implementation in accordance with the invention is shown for use with a fishing pole 14 having a rod, a reel carried by the rod, and fishing line 18 carried by the reel. The fishing hook setter 10 can be used to automatically set a hook attached to the distal free end of the fishing line 18 when pulled on by a fish, by automatically pulling the fishing pole and tensioning the fishing line, thus setting the hook in the fish's mouth. The setter 10 can be utilized to facilitate fishing for the fisherman, to help younger fishers, less-skilled fishers, inattentive fishers, or even help disabled fishers. The setter 10 can be utilized with a standard, commercially available fishing pole. Thus, the setter 10 can removably receive and carry the standard fishing pole, without modification to or altering the fishing pole. The setter can have a spring loaded pole holder to hold the fishing pole, and a trip mechanism to release the pole holder, and thus the fishing pole, when a fish bites the hook (and pulls on the fishing line), causing the spring loaded pole holder to raise the fishing pole, tensioning the fishing line, and setting the hook in the fish's mouth. The trip mechanism can be simple and easy to use. In addition, the trip mechanism and the spring loading of the pole holder can be housed safely for protection of the user, and to resist interference with the trip mechanism.

The hook setter 10 has a base 22 that can be secured to a support surface. The support surface can be the ground, such as a beach or shore of a lake or stream, a dock, a boat, etc. The base 22 can comprise a post with a proximal end with a tip that can be driven into the ground. The base 22 or post can have a secondary spike 24 at the proximal end and laterally offset with respect to the post to provide stability. In addition, the secondary spike 24 can have a lateral horizontal step 26 to facilitate driving the post or tip thereof, and the spike, into the ground. The tip of the post and the secondary spike 24 can be parallel with respect to one another with the secondary spike coupled to the post by the lateral horizontal step 26. In another aspect, the base or post can have a clamp for attaching to a dock, a railing, a boat, etc. In addition, the base or post can be elongated to have a convenient height so that a user does not have to bend over during use. The base or post can extend from the proximal end to a free distal end that can be elevated off of the ground at a convenient height. The base 22 can also comprise a housing 30 that can be disposed atop the post. The post can be a metal or plastic rod or tube. The tip can be formed in the rod or tube, or can be a separate piece attached thereto. The post can be removably coupled to the housing so that the base can be disassembled for ease of transportation and/or storage. For example, the post can be inserted into a bore in the housing and held with a retaining pin. The secondary spike 24 and the lateral horizontal step 26 can also be removably coupled to the post so that they can be disassembled.

The hook setter 10, the base 22, and/or the housing 30 comprise a pole holder 34 pivotally coupled to the base 22 or housing 30 at a pivot 38. The pole holder 34 can be or can have an open end 42, such as an open tube, to removably receive and carry the fishing pole 14. The handle of the fishing pole can be removably inserted into the open end 42 of the pole holder 34. The pole holder 34 can have a distal holding end 46 (having the open end 42) forward of the pivot 38, and lever end 50 opposite of the distal holding end with respect to the pivot, and rearward of the pivot. The pivot can be a bolt, an axel or other fastener extending through a bore between the distal holding end and the lever end of the pole holder, and through the housing of the base. The pole holder can be straight, and can be a tube. The distal holding end can be tubular, while the lever end can be thinner and substantially closed. The pole holder can be formed of plastic, and can be molded, such as by injection molding. In addition, the open end 42 of the pole holder 34 can define a front of the hook setter.

Figure 2A:
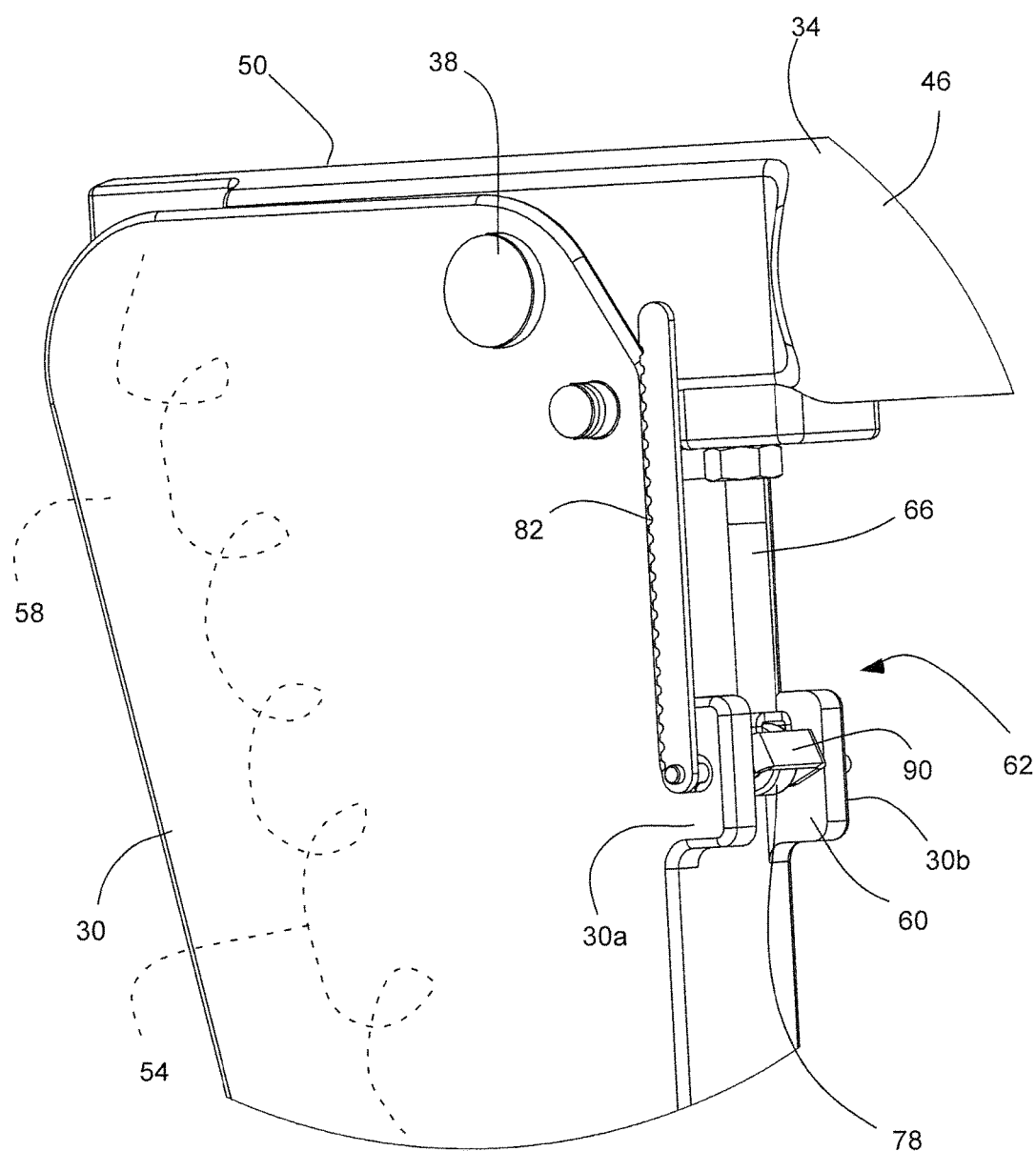
FIG. 2a is a detailed perspective view of the trip mechanism of the hook setter of FIG. 1a, shown with the pole holder in the lowered fishing position, and shown with the trigger post of the trip mechanism in the lowered position and the trigger of the trip mechanism in the cocked position.
Figure 2B:
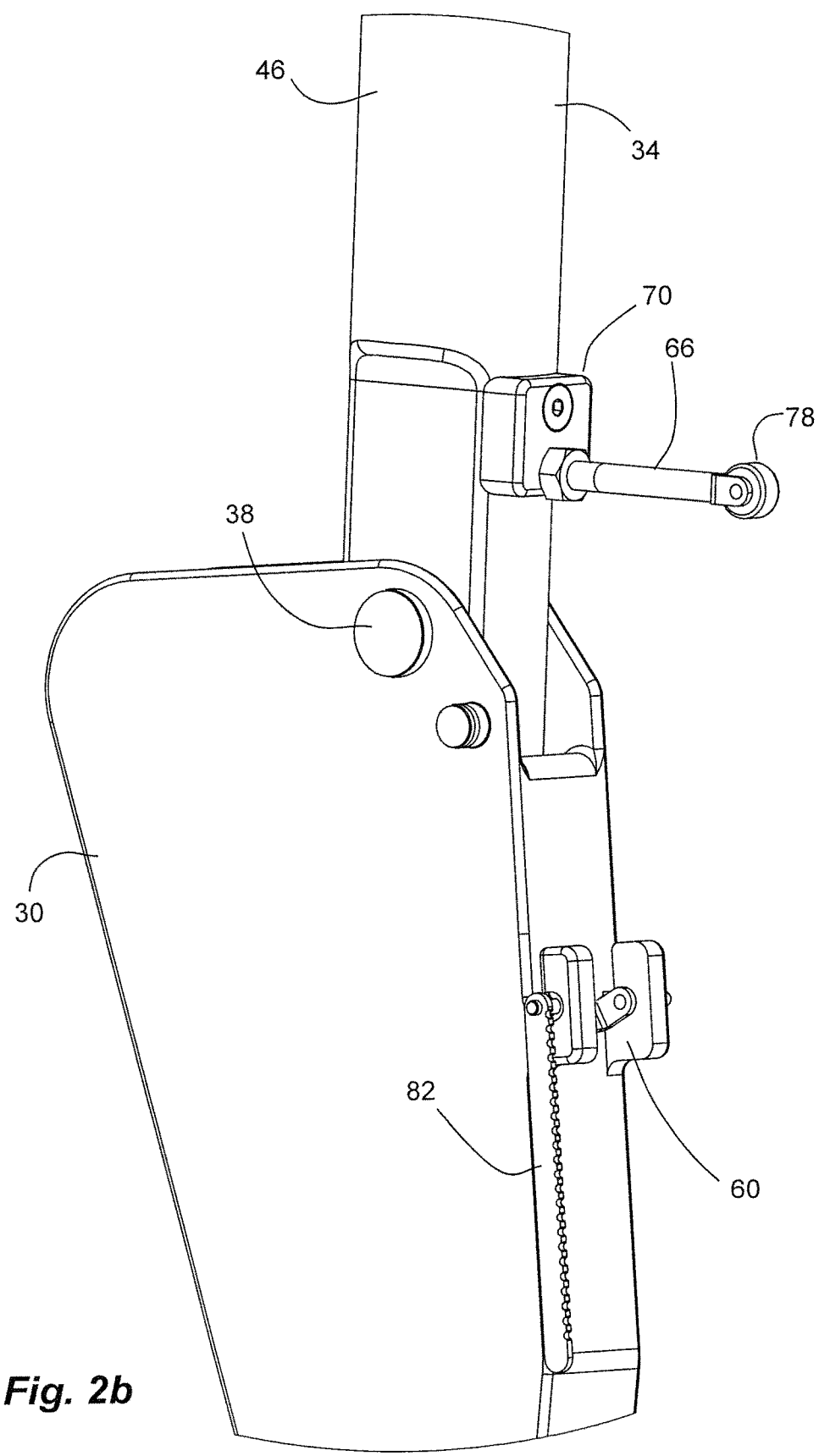
FIG. 2b is a detailed perspective view of the trip mechanism of the hook setter of FIG. 1a, shown with the pole holder in the raised set position, and shown with the trigger post of the trip mechanism in the raised position and the trigger of the trip mechanism in the un-cocked position.
Figure 6A:
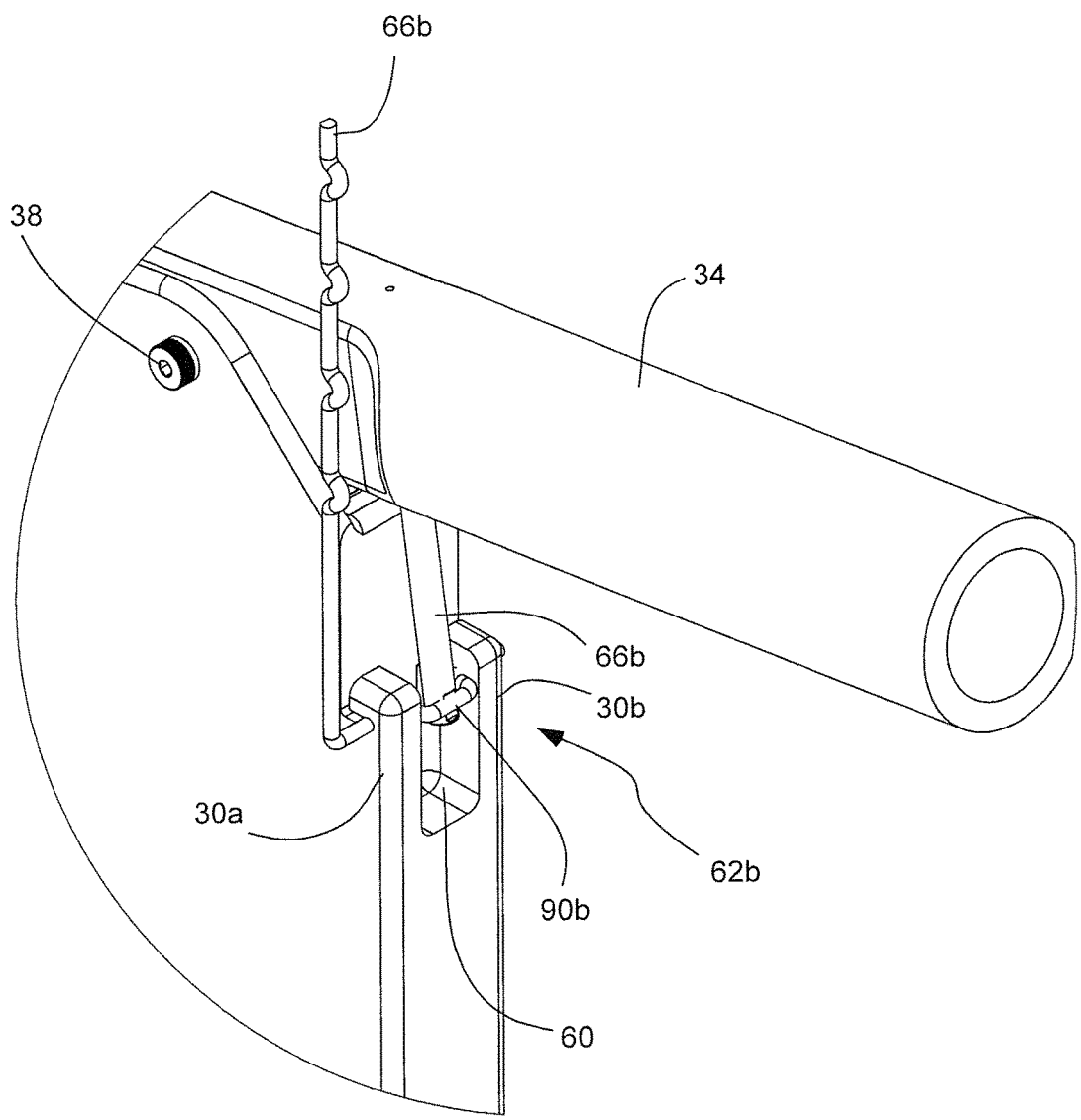
FIG. 6a is a detailed perspective view of the hook setter of FIG. 5a, shown with the pole holder in the lowered fishing position, and shown with the trigger post of the trip mechanism in the lowered position and the trigger of the trip mechanism in the cocked position.
Figure 6B:
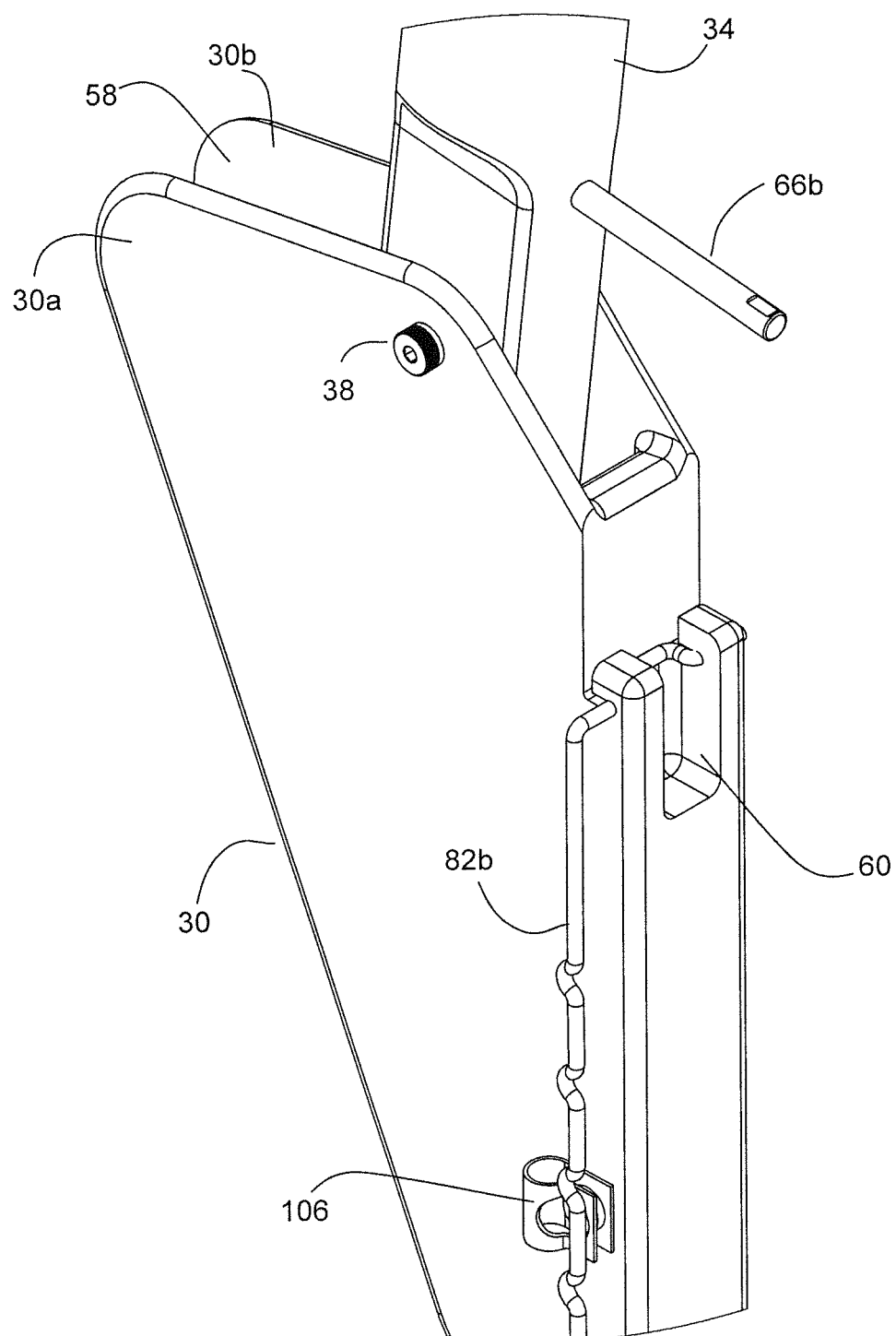
FIG. 6b is a detailed perspective view of the hook setter of FIG. 5a, shown with the pole holder in the raised set position, and shown with the trigger post of the trip mechanism in the raised position and the trigger of the trip mechanism in the un-cocked position.

The pole holder 34, and thus the fishing pole 14, is pivotal between a lowered fishing position (FIGS. 1a and 2a), and a raised set position (FIGS. 1b and 2b). A spring 54 or other biasing member is coupled between the base 22 and the pole holder 34 rearward of the pivot 38. The spring 54 can be coupled to the end of the lever end 50 of the pole holder 34. The spring 54 biases the pole holder 34, and thus the fishing pole 14, in the raised set position, and maintains tension on the pole holder in the lowered fishing position.

As described above, the fishing hook setter 10 can also have a housing 30 covering the spring 54 or the biasing member in both the lowered fishing position, and the raised set position. The housing 30 can be rigidly affixed to the post. The housing 30 can also cover some or all of the trigger post and the trigger in the lowered position, as described below. The housing 30 can have a pair of walls, brackets or flanges 30a and 30b on opposite sides of the base 22 or the post, and the pole holder 34. The brackets or flanges can be rigidly affixed to the post. The housing 30 or the brackets or flanges 30a and 30b can have the pivot 38 with the pole holder 34, or lever end 50 thereof, pivotal between the pair of brackets or flanges, or in the housing. In addition, the axel of the trigger can extending through bores in the pair of brackets or flanges, as described below. The pair of brackets or flanges can extend rearwardly to define a rear gap 58 to maintain the spring 54 or the biasing member continuously in the rear gap. Thus, the biasing member can be completely disposed in the rear gap 58, and completely covered in profile by the pair of side flanges 30a and 30b. The lever end 50 of the pole holder 34 can pivot in the gap 58 between the pair of walls 30a and 30b. Thus, the walls of the housing can resist interference with movement of the pole holder. The pair of brackets or flanges can extend forwardly to define a forward gap or notch 60 to maintain the trigger post and the trigger, or portions thereof, in the forward gap in the lowered position, and with an axel of the trigger extending across the forward gap, as described below. Thus, the forward notch 60 can be carried by the base 22 and bordered on opposite sides by the walls 30a and 30b.

In addition, the housing 30 or the pair of brackets or flanges 30a and 30b can position the pivot 38 rearward of the longitudinal (and/or vertical) axis of the post to allow the lever end 50 of the pole holder 34 to pivot into the housing, and to be substantially parallel with the post, and substantially vertical in the raised set position. The pivot 38 can be positioned over the rear gap 58 so that the pole holder 34 can pivot to be substantially vertical in the raised set position. The lever end 50 of the pole holder 34 can be thinner than the distal holding end 46; allowing the gap 58 and the housing to be thinner.

The fishing hook setter 10 also has a trip mechanism, indicated generally at 62. The trip mechanism 62 maintains the pole holder 34 in the lowered fishing position, and is engagable by the fishing line 18 (see FIG. 1a), such that tension on the fishing line (i.e. being pulled by the fish when the fish bites the hook) trips the trip mechanism to release the pole holder, and thus the fishing pole, to move to the raised set position. The trip mechanism 62 can be coupled between the base 22 and the pole holder 34 to hold the pole holder in the lowered fishing position (FIG. 1a) against the biasing member or spring 54. The trip mechanism 62 comprises a trigger post 66 and a trigger 82. The trigger post 66 is rigidly affixed to, and extends from, the pole holder 34. The trigger post 66 can be located forward of the pivot 38 in the lowered fishing position (or above the pivot in the raised set position) so that the trigger post 66 is in the front (as defined by the open end of the pole holder). The trigger post 66 pivots, along with the pole holder 34, between a lowered position (FIGS. 1a and 2a) corresponding to the lowered fishing position of the pole holder, and a raised position (FIGS. 2a and 2b) corresponding to the raised set position of the pole holder. The trigger post 66 has a proximal end attached to the pole holder 34, and distal free end releasably engaged by the trigger 82.

The trigger post 66 can be or can be formed of a metal rod. The proximal end of the trigger post 66 can be threaded. The trigger post 66 can be mounted indirectly to the pole holder 34 by a mounting block 70. The trigger post 66 can be mounted to the mounting block 70, such as by threading the proximal end of the trigger post into a threaded bore of the mounting block; and the mounting block 70 can be mounted to the pole holder. The mounting block 70 can comprise a fastener to secure the mounting block 70 to the pole holder. In addition, a nut 74 or the like can be threadedly disposed on the proximal end of the trigger post 66, and adjacent the mounting block. Thus, the trigger post 66 can have an adjustable length (or can extend and retract along its length or longitudinal axis thereof) with respect to the pole holder 34, so that the distal free end of the trigger post is selectively positionable with respect to the trigger 82, or stop thereof. Thus, the sensitivity of the trip mechanism 62 can be adjusted or tuned. For example, the trigger post 66 can be threaded in or out of a threaded bore in the mounting block 70, and secured in place with the nut 74 (by threading the nut to abut the mounting block). The mounting block 70 can have a concave surface to abut to and match a convex surface of the pole holder 34. In another aspect, the trigger post 66 can be mounted directly to the pole holder 34, such as by threading the proximal end of the trigger post into a threaded bore in the pole holder.

The distal free end of the trigger post 66 can have a wheel 78 coupled thereto. The wheel 78 can be rotatable with respect to the trigger post 66, and the trigger 82, or stop thereof. The wheel 78 can rotate about a wheel axel coupled to the distal free end of the trigger post 66. In one aspect, the wheel 78 can be held in a yoke 80 at the distal free end of the trigger post 66 to facilitate free rotation of the wheel. The yoke can have a U-shape with a bottom thereof coupled to the trigger post and the opposite ends carrying the axel. In another aspect, the wheel can rotate about a wheel axel cantilevered from the distal free end of the trigger post.

The trigger 82 is pivotally coupled to the base 22 and/or housing 30, and releasably engages the distal free end or wheel 78 of the trigger post 66 in the lowered position, to define a cocked position. The trigger 82 is engagable by the fishing line 18 to pivot the trigger. The trigger 82 can have a trigger axel 86 pivotally coupled to the base 22 or housing (or flanges 30a or 30b). The axel 86 of the trigger can extend across the forward notch 60, and between the walls 30a and 30b, so that opposite ends of the axel are captured and held by the walls. The trigger axel 86 can be cylindrical to rotate in bores in the walls. The trigger 82 can also have a stop 90 axially or radially off-set with respect to the axel 86, and to which the distal free end (or wheel 78) of the trigger post 66 abuts in the lowered position. The trigger post 66 and the stop 90 of the trigger 82 can comprise abutting surfaces that abut to one another in the cocked position of the trigger and the lowered position of the trigger post. The stop 90, being axially off-set with respect to the axel, allows the stop to move in an arcuate path, or rotate, out of abutment with the wheel of the trigger post when tripped. The stop 90 can comprise, or can be carried by, a yoke 94 to receive the distal end or wheel 78 of the trigger post 66 therein in the cocked position of the trigger and the lowered position of the trigger post. The yoke 94 can be a block U-shaped member formed by sheet metal bent into shape. The yoke 94 can bifurcate the axel 86. A bottom of the yoke can provide the stop, while opposite ends of the arms of the yoke can be coupled to the axel. In one aspect, the stop 90 can be flat and can provide a planar surface abutting to a cylindrical surface of the wheel 78. It is believed that the wheel 78 of the trigger post 66 provides a rotating surface, and the axially off-set stop 90 of the trigger 82 also provides a rotating surface, to provide a smooth release when tripped. In addition, one of the abutting surfaces can be planar (such as the stop 90), and another of the abutting surfaces can be cylindrical (such as the wheel 78). It is believed that have a cylindrical surface abutting a planar surface reduces the contacting surface area and increases the sensitivity of the trip mechanism.

The trigger 82 also has an armature 98 extending from the axel 86, and can pivot with the axel, or can cause the axel, and thus the yoke 94 and the stop 90, to pivot. The armature 98, the yoke 94 (and the stop 90), and the axel 86 can be rigidly affixed to one another so that they pivot together and a single, monolithic unit. Thus, the armature 98 and the stop 90 pivot together about the axel 86. One or more notches 102 can be formed in the armature 98 to receive the fishing line 18. Thus, tension on the fishing line 18 (when the fish pulls the fishing line when the fish bites the hook) pivots the armature 98, causing the axel 86 to pivot so that the stop 90 pivots out of abutment with respect to the distal free end or wheel 78 of the trigger post 66, freeing the trigger post, and thus the pole holder 34 and the fishing pole 14 to pivot to the raised set position under the force of the spring 54 or the biasing member, thus setting the hook in the fish's mouth. In one aspect, a plurality of notches can be formed along the length of the armature to adjust or tune the sensitivity of the trigger or trip mechanism, or to accommodate different size fish, or difference water conditions.

Figure 9:
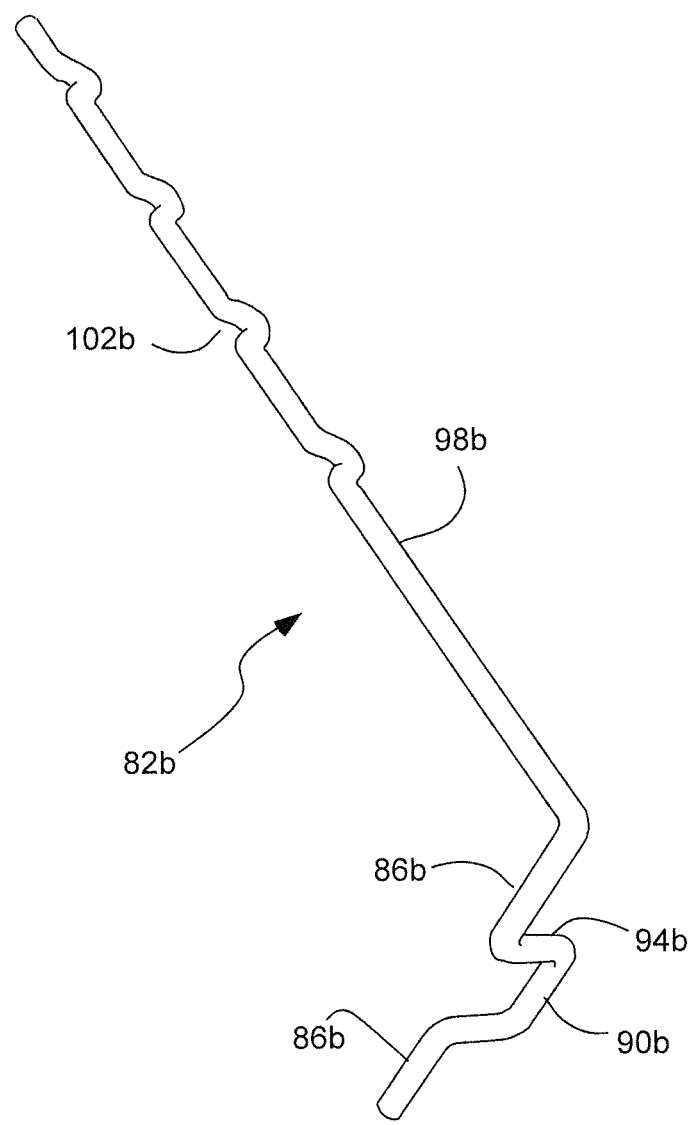

In the cocked position (FIG. 2a) of the trigger 82, the stop 90 can be positioned in front of the distal free end or wheel 78 of the trigger post 66. In one aspect, the stop 90 can be positioned forward and above the axel of the wheel. Thus, the wheel 86 is held in position, and the trigger post 66 is held in the lowered position, and the pole holder 34 is held in the lowered fishing position. The trigger 82 and the trigger post 66 can be oriented with the stop 90 of the trigger exerting a lateral force (as opposed to a tension force) on the distal end or wheel 78 of the trigger post 66, with the trigger post cantilevered from the pole holder 34. Thus, the pole holder is held in compression force, rather than tension force. In addition, the armature 98 can be in a raised orientation extending upwardly from the axel 86 in the cocked position of the trigger to facilitate looping the fishing line around the armature. The stop 90 can pivot forwardly and downwardly, and the armature 66 can pivot forwardly and upwardly, when released or pulled by the fishing line. Thus, the armature 98 and the yoke 94 (or axis of the stop 90 from the axel 86) can be oriented at an acute angle with respect to one another in order to position the stop ahead and above the distal end or wheel 78 of the trigger post 66 in the cocked position while the armature is vertical. In another aspect, the armature and yoke can be oriented substantially perpendicularly to one another (as shown in FIG. 9).

In addition, the distal end or wheel 78 of the trigger stop 66 can be disposed in the forward notch 60 of the housing 30 in the lowered position of the trigger stop. Similarly, the stop 90 of the trigger 82 can be disposed in the forward notch 60 of the housing in the cocked position of the trigger. Thus, the forward notch 60 of the housing, and the walls 30a and 30b of the housing, can protect the trip mechanism.

Referring to FIGS. 5a-9, another automatic fishing hook setter 10b is shown that is similar in most respects to that described above, and which description is hereby incorporated herein by reference. The hook setter 10b can have a trigger 82b formed of an elongated trigger wire bent to form the trigger. The trigger wire can be bent with a substantially right angle bend forming the axel 86b on one side thereof, and the armature 98b on the other side thereof. The trigger wire can be bent with a plurality of bends in the axel portion 86b to form the stop 90b extending from the axel. The axel wire can be bent with at least one bend in the armature to form the notch 102b. In one aspect, the armature 98b and the yoke 94b (or axis of the stop 90b from the axel 86b) can be oriented substantially perpendicularly to one another in order to position the stop ahead of the distal end of the trigger post in the cocked position while the armature is vertical. In another aspect, the armature and the stop or yoke can be oriented at an acute angle with respect to one another. The stop can have a cylindrical surface. The trigger post 66b can have a distal end without a wheel, but with a planer surface formed in a rod. Thus, the trip mechanism can comprise abutting cylindrical and planar surfaces. In addition, a clip or catch 106 can be carried by the base or the housing, and can receive and hold the armature of the trigger when not in use.

A method of using the fishing hook setter 10 or 10b comprises (not necessarily in order):
1) moving the pole holder 34 from the raised set position to the lowered fishing position against the force of the spring 54 or the biasing member, and so that the trigger post is in the lowered position;
2) pivoting the trigger 82 so that the stop 90 is positioned in front of the distal free end or wheel 78 of the trigger post 66, and allowing the distal free end of the trigger post to abut the stop of the trigger, thus holding the pole holder in the lowered fishing position against the force of the spring or the biasing member;
3) removably coupling the fishing pole in the pole holder; and
4) looping the fishing line 18 around the notch 102 of the armature 98 of the trigger so that the fishing line extends from the reel, around the armature in the notch, and along the pole.

As indicated above, the hook setter can be disassembled. The components can be carried in a case to facilitate transportation of the hook setter, and to protect the components.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A fishing hook setter device configured to receive and carry a fishing pole with a fishing line, the device comprising:
   a) a base configured to be secured to a support surface;
   b) a pole holder pivotally coupled to the base at a pivot, and having an open end configured to removably receive and carry the fishing pole, the open end of the pole holder defining a front;
   c) the pole holder being pivotal between a lowered fishing position, and a raised set position;
   d) a biasing member coupled between the base and the pole holder rearward of the pivot, and biasing the pole holder to the raised set position, and maintaining tension on the pole holder in the lowered fishing position;
   e) a trip mechanism coupled between the base and the pole holder to hold the pole holder in the lowered fishing position against the biasing member, and configured to be engaged by the fishing line such that tension on the fishing line trips the trip mechanism to release the pole holder to move to the raised set position;
   f) the trip mechanism comprising:
      i) a trigger post rigidly affixed to and extending from the pole holder and located forward of the pivot, the trigger post pivoting with the pole holder between a lowered position corresponding to the lowered fishing position of the pole holder, and a raised position corresponding to the raised set position of the pole holder, the trigger post having a distal free end; and
      ii) a trigger pivotally coupled to the base, and releasably engaging the distal free end of the trigger post in the lowered position to define a cocked position, and configured to be engaged by the fishing line to pivot the trigger, the trigger having an axel pivotally coupled to the base, a stop axially off-set with respect to the axel to which the distal free end of the trigger post abuts in the lowered position, an armature extending from the axel, and a notch in the armature configured to receive the fishing line, the armature and the stop pivoting together about the axel; and
   g) the stop of the trigger being positioned in front of the distal free end of the trigger post in the cocked position of the trigger, and the armature being oriented in a raised orientation extending upwardly from the axel in the cocked position of the trigger.

2. The device in accordance with claim 1, wherein the trigger and the trigger post are oriented with the stop of the trigger exerting a lateral force on the distal end of the trigger post with the trigger post cantilevered from the pole holder.

3. The device in accordance with claim 1, wherein the base comprises a vertical post, and wherein the pivot of the pole holder is positioned behind a longitudinal axis of the vertical post.

4. The device in accordance with claim 1, further comprising:
a forward notch carried by the base and bordered on opposite sides by walls;
the axel of the trigger extending across the notch and between the walls so that opposite ends of the axel are captured by the walls; and
the stop comprising a yoke to receive the distal end of the trigger post therein in the cocked position of the trigger and the lowered position of the trigger post.

5. The device in accordance with claim 1, wherein the trigger post and the stop of the trigger comprise abutting surfaces that abut to one another in the cocked position of the trigger and the lowered position of the trigger post, and wherein one of the abutting surfaces is planar, and another of the abutting surfaces is cylindrical.

6. The device in accordance with claim 1, wherein the trigger post is extendable and retractable with respect to the pole holder so that the distal free end of the trigger post is selectively positionable with respect to the stop of the trigger.

7. The device in accordance with claim 1, further comprising:
a wheel coupled to the distal free end of the trigger post and rotatable with respect to the trigger post and the stop of the trigger.

8. The device in accordance with claim 7, wherein the stop of the trigger is disposed in front of and above a pivot axis of the wheel in the cocked position of the trigger and the lowered position of the trigger post.

9. The device in accordance with claim 7, wherein the stop of the trigger comprises a planar surface abutting to a cylindrical surface of the wheel of the trigger post in the cocked position of the trigger and the lowered position of the trigger post.

10. The device in accordance with claim 1, further comprising:
a housing with a pair of side flanges defining a rear gap; and
the biasing member being completely disposed in the gap and completely covered in profile by the pair of side flanges.

11. The device in accordance with claim 1, further comprising:
a housing with a pair of side flanges defining a forward notch;
the distal end of the trigger stop being disposed in the forward notch in the lowered position; and
the stop of the trigger being disposed in the forward notch.

12. The device in accordance with claim 1, wherein the trip mechanism comprises a wheel abutting a surface.

13. A fishing hook setter device configured to receive and carry a fishing pole with a fishing line, the device comprising:
a) a base configured to be secured to a support surface;
b) a pole holder pivotally coupled to the base at a pivot, and having an open end configured to removably receive and carry the fishing pole, the open end of the pole holder defining a front;
c) the pole holder being pivotal between a lowered fishing position, and a raised set position;
d) a biasing member coupled between the base and the pole holder rearward of the pivot, and biasing the pole holder to the raised set position, and maintaining tension on the pole holder in the lowered fishing position;
e) a trip mechanism coupled between the base and the pole holder to hold the pole holder in the lowered fishing position against the biasing member, and configured to be engaged by the fishing line such that tension on the fishing line trips the trip mechanism to release the pole holder to move to the raised set position;
f) the trip mechanism comprising:
i) a trigger post extending from the pole holder, the trigger post pivoting with the pole holder between a lowered position corresponding to the lowered fishing position of the pole holder, and a raised position corresponding to the raised set position of the pole holder, the trigger post having a distal free end; and
ii) a trigger pivotally coupled to the base, and releasably engaging the distal free end of the trigger post in the lowered position to define a cocked position, and configured to be engaged by the fishing line to pivot the trigger, the trigger having an axel pivotally coupled to the base, a stop axially off-set with respect to the axel to which the distal free end of the trigger post abuts in the lowered position, an armature extending from the axel, and a notch in the armature configured to receive the fishing line, the armature and the stop pivoting together about the axel; and
g) a wheel coupled to the distal free end of the trigger post and rotatable with respect to the trigger post and the stop of the trigger.

14. The device in accordance with claim 13, further comprising:
a forward notch carried by the base and bordered on opposite sides by walls;
the axel of the trigger extending across the notch and between the walls so that opposite ends of the axel are captured by the walls; and
the stop comprising a yoke to receive the distal end of the trigger post therein in the cocked position of the trigger and the lowered position of the trigger post.

15. The device in accordance with claim 13, wherein the trigger post is extendable and retractable with respect to the pole holder so that the distal free end of the trigger post is selectively positionable with respect to the stop of the trigger.

16. The device in accordance with claim 13, wherein the stop of the trigger is disposed in front of and above a pivot axis of the wheel in the cocked position of the trigger and the lowered position of the trigger post.

17. The device in accordance with claim 7, wherein the stop of the trigger comprises a planar surface abutting to a cylindrical surface of the wheel of the trigger post in the cocked position of the trigger and the lowered position of the trigger post.

18. A fishing hook setter device configured to receive and carry a fishing pole with a fishing line, the device comprising:
a) a base configured to be secured to a support surface;
b) a pole holder pivotally coupled to the base at a pivot, and having an open end configured to removably receive and carry the fishing pole, the open end of the pole holder defining a front;
c) the pole holder being pivotal between a lowered fishing position, and a raised set position;
d) a biasing member coupled between the base and the pole holder rearward of the pivot, and biasing the pole holder to the raised set position, and maintaining tension on the pole holder in the lowered fishing position;
e) a trip mechanism coupled between the base and the pole holder to hold the pole holder in the lowered fishing position against the biasing member, and configured to be engaged by the fishing line such that tension on the fishing line trips the trip mechanism to release the pole holder to move to the raised set position;
f) the trip mechanism comprising:
   i) a trigger post extending from the pole holder, the trigger post pivoting with the pole holder between a lowered position corresponding to the lowered fishing position of the pole holder, and a raised position corresponding to the raised set position of the pole holder, the trigger post having a distal free end; and
   ii) a trigger pivotally coupled to the base, and releasably engaging the distal free end of the trigger post in the lowered position to define a cocked position, and configured to be engaged by the fishing line to pivot the trigger, the trigger having an axel pivotally coupled to the base, a stop axially off-set with respect to the axel to which the distal free end of the trigger post abuts in the lowered position, an armature extending from the axel, and a notch in the armature configured to receive the fishing line, the armature and the stop pivoting together about the axel; and
g) the trigger post extendable and retractable with respect to the pole holder so that the distal free end of the trigger post is selectively positionable with respect to the stop of the trigger.

19. The device in accordance with claim 18, further comprising:
a wheel coupled to the distal free end of the trigger post and rotatable with respect to the trigger post and the stop of the trigger.

20. The device in accordance with claim 19, wherein the stop of the trigger is disposed in front of and above a pivot axis of the wheel in the cocked position of the trigger and the lowered position of the trigger post.

* * * * *